(12) United States Patent
Agutter

(10) Patent No.: US 6,662,887 B2
(45) Date of Patent: Dec. 16, 2003

(54) CLAMPING SYSTEM

(75) Inventor: David George Agutter, Derbyshire (GB)

(73) Assignee: Powermade Designs Ltd., Chesterfield (GB)

(*) Notice: Subject to any disclaimer, the term of this patent is extended or adjusted under 35 U.S.C. 154(b) by 0 days.

(21) Appl. No.: 10/068,428

(22) Filed: Feb. 6, 2002

(65) Prior Publication Data

US 2002/0108792 A1 Aug. 15, 2002

(30) Foreign Application Priority Data

Feb. 13, 2001 (GB) ............................................. 0103485

(51) Int. Cl.$^7$ ............................................. B62D 51/04
(52) U.S. Cl. ..................... 180/11; 180/19.1; 248/230.6; 280/DIG. 5
(58) Field of Search ........................ 180/11, 19.1, 19.2, 180/19.3, 12, 16; 280/47.31, 47.3, DIG. 5; 248/231.71, 231.41, 230.3, 230.6, 230.2

(56) References Cited

U.S. PATENT DOCUMENTS

| | | | | |
|---|---|---|---|---|
| 2,812,824 A | * | 11/1957 | Adams | |
| 3,059,713 A | * | 10/1962 | Beggs | |
| 3,094,185 A | * | 6/1963 | Racoosin | |
| 3,815,699 A | * | 6/1974 | Ganskopp et al. | 180/11 |
| 4,105,084 A | * | 8/1978 | Baak | 180/11 |
| 4,356,875 A | * | 11/1982 | Clune | 180/13 |
| 4,418,776 A | * | 12/1983 | Weirick | 180/19 H |
| 4,570,731 A | * | 2/1986 | Oaks | 180/19.3 |
| 5,232,065 A | * | 8/1993 | Cotton | 180/11 |

FOREIGN PATENT DOCUMENTS

GB 2265410 9/1993

* cited by examiner

*Primary Examiner*—Avraham Lerner
(74) *Attorney, Agent, or Firm*—Trexler, Bushnell, Giangiorigi, Blackstone & Marr, Ltd.

(57) ABSTRACT

A clamping system for releasably clamping a golf trolley, to a power drive unit comprises a clamping unit adapted in use to be permanently secured to the golf trolley and comprising a clamping plate and a mounting plate, the latter having an outer face, and an inner, clamping face. An element of the golf trolley is located between the clamping face of the mounting plate and an opposed face of the clamping plate and is then clamped therebetween by tightening of manually operable stud. A first formation is provided on the outer face of the mounting plate; a second formation is provided on a top plate of a yoke of said power drive unit, with the first and second formations providing for screwless, sliding interengagement therebetween, and a locking or latching pin is manually displaceable between operative and release positions.

14 Claims, 2 Drawing Sheets

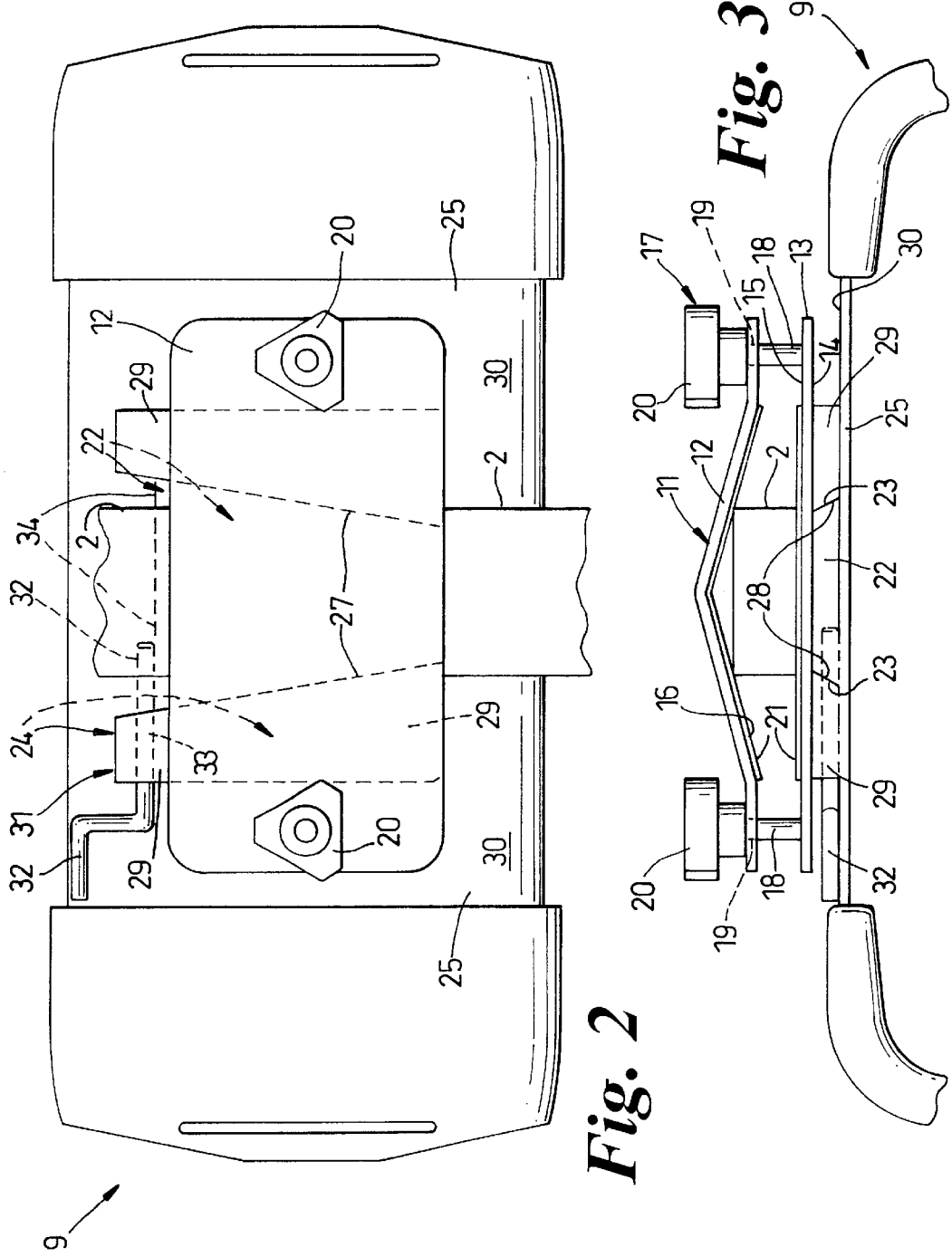

CLAMPING SYSTEM

RELATED/PRIORITY APPLICATION

This application claims priority with respect to British Application No. 0103485.9, filed Feb. 13, 2001.

FIELD OF THE INVENTION

This invention relates to a clamping system particularly, but not exclusively, for releasably clamping a power drive unit to a golf trolley, or golf cart (hereafter referred to as a golf trolley).

BACKGROUND OF THE INVENTION

In our co-pending GB Patent Application 0022666.2 (=U.S. Ser. No. 29/132,251) is described a power drive unit for attachment by the user to a golf trolley, to render motorized and otherwise manually operable trolley.

For purposes of attachment to a golf trolley the unit incorporates a shallow 'V'-shaped clamping plate with, at each end of the clamping plate, two manually operable clamping screws, with an element of the golf trolley located and clamped between the clamp plate and a top plate of a yoke of the attachment.

It is frequently necessary to release the power unit from the golf trolley eg for loading into the boot of a car, with re-attachment at a golf course. In detail re-attachment involves removing at least one of the two clamping screws and at least releasing the other whereby an element of the trolley may be manoeuvred between the clamp plate and the yoke, the removed screw inserted into its tapped hole, and both screws tightened, and some golfers find this an awkward operation.

OBJECT OF THE INVENTION

A basic object of the invention is the provision of an improved clamping system.

SUMMARY OF THE INVENTION

According to the present invention there is provided a clamping system for releasably clamping a first component, such as a golf trolley, to a second component, such as a power drive unit comprising (i) a clamping unit adapted in use to be permanently secured to the first component and comprising a clamping plate and a mounting plate, the latter having an outer face, and an inner, clamping face the arrangement being such that an element of the first component eg a golf trolley may be located between the clamping face of the mounting plate and an opposed face of the clamping plate and then be clamped therebetween by tightening of manually operable screw means;

(ii) a first formation provided on the outer face of the mounting plate;

(iii) a second formation provided on a portion of the second component, such as a top plate of a yoke of a power drive unit, with the first and second formations providing for screwless, sliding interengagement therebetween, with (iv) a locking or latching means manually displaceable between an operative position in which inadvertent disengagement of the formations is prevented, and a release position, in which release is permitted.

ADVANTAGE(S) OF THE INVENTION

The clamping system of the invention provides for the once only attachment of the clamping unit to one component eg the golf trolley. As only two plates, which can be of relatively small size, and two screws are involved, attachment is relatively straightforward, and it is intended that the clamping unit, remains permanently attached to the golf trolley.

Attachment of the second component eg the power unit, to the first component eg the golf trolley, is effected in a screwless manner simply by presenting the formations in suitable juxtaposition, and sliding them into mutual engagement, after which the latching means is moved to its latching position. The reverse of this procedure is followed to effect detachment eg to separate the golf trolley and the power unit, prior to loading the trolley and the power unit separately eg into a car boot or trunk.

PREFERRED OR OPTIONAL FEATURES OF THE INVENTION

The clamping plate and the mounting plate are of sheet metal.

The clamping plate is of shallow 'V' configuration.

The mounting plate is planar.

The mounting plate carries two spaced apart threaded studs, each adapted to pass through a plane hole of the clamping plate, for the fitment of a clamping nut onto the exposed screw end, for suitable tightening to effect clamping of the clamping unit to the golf trolley.

The clamping face of the clamping plate is provided with a friction increasing and/or resilient coating eg of rubber or synthetic plastics material.

The formations are so profiled to provide for male/female engagement.

The formations are dovetail formation.

The formations are a 'V' male to engage a 'V' recess with dovetailed side edges.

The 'V'-recess is defined by two suitably spaced apart blocks.

The blocks are secured by screws to the outer surface of the clamping plate.

The formations are of synthetic plastics material.

The locking or latching means comprises a transversely moveable pin slidably passing through a support hole in one formation eg the female formation, and adapted to engage behind the inserted male formation.

BRIEF DESCRIPTION OF THE DRAWINGS

One embodiment of clamping system in accordance with the invention will now be described in greater detail, by way of example, with reference to the accompanying drawings, in which:

FIG. 2 is a plan view of a portion of FIG. 1; and

FIG. 3 is a front elevation of a portion of FIG. 2.

Figure 1:
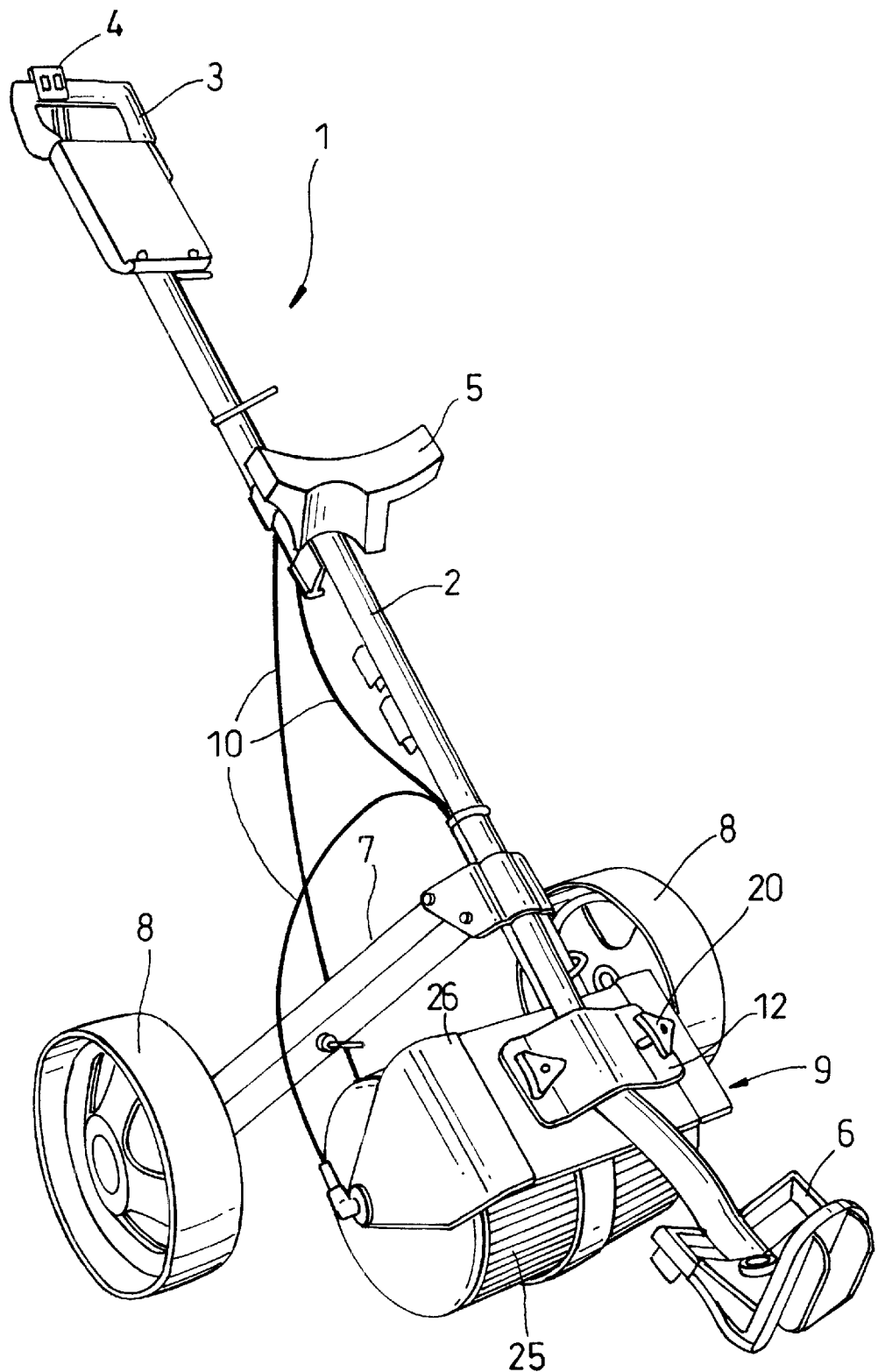
FIG. 1 is a perspective view of a golf trolley.

In the drawings, a golf trolley 1 comprises an adjustable length metal shaft 2 of rectangular section provided at one end with a handgrip 3 carrying control switches 4. The shaft also carries spaced apart cradles 5, 6 to receive a golf bag (not shown), whilst part way along its length is attached an inverted 'V'-shaped structure 7 carrying freely rotatable ground wheels 8. Between the structure 7 and the cradle 6 is attached a power drive unit 9 in accordance with GB 00022666.2, which unit 9 is connected by electrical leads 10 to the switches 4.

In accordance with the invention, the power drive unit 9 is attachable to the shaft 2 by a clamping system shown in FIGS. 2 and 3, for releasably clamping a first component, ie a golf trolley 1, to a second component, ie a power drive unit 9.

The clamping system comprises a clamping unit 11 adapted in use to be permanently secured to the shaft 2, and comprising a sheet metal clamping plate 12 of shallow 'V'-configuration and a sheet metal, planar mounting plate 13, the latter having an outer face 14, and an inner, clamping face 15, the arrangement being such that a portion of the shaft 2 is located between the clamping face 15 of the mounting plate 13 and an opposed face 16 of the clamping plate 12 and then be clamped therebetween by tightening of manually operable screw means 17, comprising two spaced apart threaded studs 18 carried by the mounting plate 13, each stud 18 being adapted to pass through a plane hole 19 of the clamping plate 12, for the fitment of a clamping nut 20 onto the exposed screw end, for suitable manual tightening, to effect permanent clamping of the clamping unit 11 to the shaft 2 of the golf trolley 1.

Both the clamping face 15 of the clamping plate 12, and the face 16 of the mounting plate 13, are provided with a friction increasing and/or resilient coating 21 eg of rubber or synthetic plastics material.

A first 'V'-shaped male formation 22, of synthetic plastics material, is provided on the outer face 14 of the mounting plate 13, with angled sidewalls 23 to define a dovetail wedge.

A second formation 24, also of synthetic plastics material, is provided on a portion of a top plate 25 of a yoke 26 of the power drive unit 9, and incorporates a 'V'-recess 27 with angled sidewalls 28 defined by two suitably spaced apart blocks 29, secured by screws (not shown) to outer surface 30 of the top plate 25, for slidable insertion, and removal, of the first formation 22.

The first and second formations 22, 24 thus provide for screwless, sliding interengagement therebetween.

A locking or latch means 31 comprises a transversely movable pin 32 slidably passing through a support hole 33 in one block 29, and adapted to engage behind an upper end 34 of the inserted male formation 22. The pin 32 is thus manually displaceable between an operative position in which inadvertent disengagement of the formations 22, 24 is prevented, and a release position, in which release is permitted.

What is claimed is:

1. A system comprising:
   a golf trolley having an element;
   a power drive unit having a yoke, said yoke having a top plate;
     a clamping unit adapted, in use, to be permanently secured to said golf trolley and comprising a clamping plate and a mounting plate, said mounting plate having both an outer face, and an inner, clamping face, the arrangement being such that said element of said golf trolley, is locatable between said clamping face of said mounting plate and an opposed face of said clamping plate and is then clampable therebetween by tightening of manually operable screw means;
     a first formation provided on said outer face of said mounting plate;
     a second formation provided on said top plate of said yoke of said power drive unit, with said first and second formations providing for screwless, sliding interengagement therebetween, and
     a locking or latching means manually displaceable between an operative position in which inadvertent disengagement of said formations is prevented, and a release position, in which disengagement of said formations is permitted.

2. A system as claimed in claim 1, wherein said clamping plate and said mounting plate are formed of sheet metal.

3. A system as claimed in claim 1, wherein said clamping plate is of shallow 'V'-configuration.

4. A system as claimed in claim 1, wherein said mounting plate is planar.

5. A system as claimed in claim 1, wherein said mounting plate carries two spaced apart threaded studs, each adapted to pass through a plane hole of said clamping plate, for the fitment of a clamping nut onto an exposed position of each of said studs, for suitable tightening, to effect clamping of said clamping unit to said golf trolley.

6. A system as claimed in claim 1, wherein said clamping face of said clamping plate is provided with a friction increasing and/or resilient coating.

7. A system as claimed in claim 6, wherein said coating is of rubber or synthetic plastics material.

8. A system as claimed in claim 1, wherein said first and second formations are so profiled to provide for male/female engagement.

9. A system as claimed in claim 1, wherein said first and second formations are dovetail formation.

10. A system as claimed in claim 9, wherein said first and second formations are a 'V' male to engage a 'V'-recess with dovetailed side edges.

11. A clamping system as claimed in claim 10, wherein said 'V'-recess is defined by two suitably spaced apart blocks.

12. A clamping system as claimed in claim 11, wherein said blocks are secured by screws to said outer surface of said clamping plate.

13. A clamping system as claimed in claim 1, wherein said first and second formations are of synthetic plastics material.

14. A clamping system as claimed in claim 1, wherein said locking or latching means comprises a transversely moveable pin slidably passing through a support hole in said female formation, and adapted to engage behind said inserted male formation.

* * * * *